United States Patent
Hafner et al.

(10) Patent No.: US 11,677,341 B2
(45) Date of Patent: *Jun. 13, 2023

(54) GENERATION OF MOTOR DRIVE SIGNALS WITH MISALIGNMENT COMPENSATION

(71) Applicant: Infineon Technologies AG, Neubiberg (DE)

(72) Inventors: Thomas Hafner, Klagenfurt (AT); Leo Aichriedler, Puch (AT); Gerald Wriessnegger, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,805

(22) Filed: Apr. 30, 2021

(65) Prior Publication Data
US 2021/0265927 A1    Aug. 26, 2021

Related U.S. Application Data

(63) Continuation of application No. 15/680,469, filed on Aug. 18, 2017, now Pat. No. 11,038,444.

(51) Int. Cl.
| | |
|---|---|
| *H02P 21/32* | (2016.01) |
| *H02P 25/22* | (2006.01) |
| *H02P 6/16* | (2016.01) |
| *H02P 6/10* | (2006.01) |
| *H02P 21/18* | (2016.01) |
| *H02P 21/10* | (2016.01) |

(52) U.S. Cl.
CPC ............... *H02P 6/16* (2013.01); *H02P 6/10* (2013.01); *H02P 21/10* (2013.01); *H02P 21/18* (2016.02); *H02P 2203/03* (2013.01)

(58) Field of Classification Search
CPC .................................. H02P 6/00; H02P 6/157
See application file for complete search history.

(56) References Cited

U.S. PATENT DOCUMENTS

| | | | | |
|---|---|---|---|---|
| 8,018,193 | B1 * | 9/2011 | Pekarek | H02P 23/12 318/400.15 |
| 2006/0001392 | A1 * | 1/2006 | Ajima | H02P 6/10 318/432 |
| 2011/0062904 | A1 | 3/2011 | Egami | |

(Continued)

FOREIGN PATENT DOCUMENTS

| | | |
|---|---|---|
| DE | 102008005054 A1 | 1/2009 |
| DE | 102012102050 A1 | 9/2013 |

(Continued)

OTHER PUBLICATIONS

Wikipedia article, "Vector control (motor)", retrieved from internet Aug. 17, 2017, 7 pages, https://en.wikipedia.org/wiki/Vector_control.

*Primary Examiner* — Bickey Dhakal
*Assistant Examiner* — Charles S Laughlin
(74) *Attorney, Agent, or Firm* — Slater Matsil, LLP

(57) ABSTRACT

A motor drive circuit provides a drive signal to an electronically commutated motor. A control circuit the motor drive circuit based on calibration data. The calibration data indicate a relationship between an actual angular position of a rotor of the motor in response to the drive signal and an expected angular position of a rotor of an ideal motor in response to the drive signal.

23 Claims, 14 Drawing Sheets

(56) References Cited

U.S. PATENT DOCUMENTS

2015/0214875 A1* 7/2015 Matsui ..................... H02P 6/15
318/400.13
2016/0359442 A1 12/2016 Zhao et al.

FOREIGN PATENT DOCUMENTS

| DE | 102013201234 A1 | 7/2014 |
|---|---|---|
| JP | H01298983 A | 12/1989 |
| JP | 2009254138 A | 10/2009 |
| JP | 2017143603 A | 8/2017 |

* cited by examiner

| $I_U$ | $I_V$ | $I_W$ | $\Phi_e$ | $\varphi_e$ | $\varphi_m$ | $\Delta\varphi$ | $\Delta\Phi$ | $\Phi_m$ |
|---|---|---|---|---|---|---|---|---|
| 1 | 0 | 0 | 0° | 0° | 0° | 0° | 0° | 0° |
| 1 | 1 | 0 | 60° | 20° | 22.5° | 2.5° | 7.5° | 67.5° |
| 0 | 1 | 0 | 120° | 40° | 45° | 5° | 15° | 135° |
| 0 | 1 | 1 | 180° | 60° | 62.5° | 2.5° | 10° | 187.5° |
| 0 | 0 | 1 | 240° | 80° | 80° | 0° | 0° | 240° |
| 1 | 0 | 1 | 300° | 100° | 100° | 0° | 0° | 300° |
| 1 | 0 | 0 | 0° | 120° | 120° | 0° | 0° | 0° |
| 1 | 1 | 0 | 60° | 140° | 141° | 1° | 3° | 63° |
| 0 | 1 | 0 | 120° | 160° | 162° | 2° | 6° | 126° |
| 0 | 1 | 1 | 180° | 180° | 182.5° | 1° | 3° | 183° |
| 0 | 0 | 1 | 240° | 200° | 200° | 0° | 0° | 240° |
| 1 | 0 | 1 | 300° | 220° | 220° | 0° | 0° | 300° |
| 1 | 0 | 0 | 0° | 240° | 240° | 0° | 0° | 0° |
| 1 | 1 | 0 | 60° | 260° | 260° | 0° | 0° | 60° |
| 0 | 1 | 0 | 120° | 280° | 280° | 0° | 0° | 120° |
| 0 | 1 | 1 | 180° | 300° | 300° | 0° | 0° | 180° |
| 0 | 0 | 1 | 240° | 320° | 320° | 0° | 0° | 240° |
| 1 | 0 | 1 | 300° | 340° | 340° | 0° | 0° | 300° |

GENERATION OF MOTOR DRIVE SIGNALS WITH MISALIGNMENT COMPENSATION

This application is a continuation of U.S. patent application Ser. No. 15/680,469, filed on Aug. 18, 2017, which application is hereby incorporated herein by reference in its entirety.

TECHNICAL FIELD

The present application relates to motor controllers, a motor system, and to a method of operating a motor.

BACKGROUND

In the field of electric motors, it is known to use so-called brushless motors of a type referred to as EC (Electronically Commutated) or BLDC (Brushless Direct Current) motor, which avoids the need to supply current via brush contacts to a rotor of the motor. In such motor, a rotating magnetic field is generated by supplying a varying drive signal to stator windings of a stator of the motor. This magnetic field is also referred to as stator magnetic field. In typical designs, the motor has multiple phases, each corresponding to a set of stator windings supplied by a corresponding component of the drive signal. For example, in the case of a three-phase design, the motor has three stator segments, each having a corresponding set of stator windings and being supplied by one out of three components of the drive signal.

The rotor of the motor is provided with one or more permanent magnets, also referred to as rotor magnets. The rotor magnets generate a magnetic field which is also referred to as rotor magnetic field. The stator magnetic field causes a torque on the rotor magnets. It is the torque on the rotor magnets that causes an overall torque on the rotor and will lead to a rotation of the rotor. A maximum torque on the rotor may be achieved by generating the stator magnetic field to have an orientation which has angle of 90° with respect to an orientation of the rotor magnetic field.

While the rotor is rotating, the drive signal is typically generated with the aim of causing the stator magnetic field to rotate synchronously with the rotor. This may be achieved by generation the drive signal as a function of an estimated or measured angular position of the rotor, e.g., using a vector control scheme as described in US 2016/0359442 A1.

In practice, the motor typically differs from an ideal implementation of the motor, e.g., due to variations of manufacturing processes. Deviations from the ideal implementation may concern the stator windings or the rotor magnets. Especially in small power and/or small size motors imperfect stator windings may have the effect that the actual stator magnetic field deviates from the stator magnetic field as assumed for the ideal motor implementation. Further, shape, position, or magnetization of one or more rotor magnets may deviate from the ideal motor implementation, with the effect that the rotor magnetic field deviates from the stator magnetic field as assumed for the ideal implementation of the motor. Due to these deviations of the stator magnetic field and/or rotor magnetic field from the ideal implementation, the orientations of the stator magnetic field and rotor magnetic field relative to each other may vary over one revolution of the motor, which causes corresponding variations of the torque exerted on the rotor. Over multiple revolutions of the motor, repetitions of the variations of the torque result in a phenomenon referred to as "torque ripple".

The torque ripple may adversely affect motor efficiency and may result in undesirable noise. In some cases the torque ripple may also have a frequency which stimulates resonant behavior of a control circuit generating the drive signal of the motor and may thus lead to instability of motor control. Imperfections of stator windings and/or imperfections of rotor magnets of an EC motor may thus adversely affect operation characteristics of the motor. On the other hand, it may be excessively costly to avoid such imperfections during manufacturing of the EC motor.

SUMMARY

According to an embodiment, a motor controller is provided. The motor controller comprises a motor drive circuit and a control circuit. The motor drive circuit is configured to provide a drive signal, e.g. to an electronically commutated (EC) motor. The control circuit is configured to control the motor drive circuit based on calibration data. The calibration data indicate a relationship between an actual angular position of a rotor of the motor in response to the drive signal and an expected angular position of a rotor of an ideal motor in response to the drive signal.

According to a further embodiment, a motor calibration device is provided. The motor calibration device comprises a control circuit configured to control a drive signal provided to a motor, e.g. EC motor. Further, the motor calibration device comprises a calibration circuit. The calibration circuit is configured to receive at least one measured angular position of a rotor of the motor in response to the drive signal. Further, the calibration circuit is configured to determine calibration data based on the at least one measured angular position. The calibration data indicate a relationship between an actual angular position of the rotor in response to the drive signal and an expected angular position of a rotor of an ideal motor in response to the drive signal.

According to a further embodiment, a method of controlling a motor is provided. The method comprises providing a drive signal to an EC motor. Further, the method comprises controlling the drive signal based on calibration data. The calibration data indicate a relationship between an actual angular position of a rotor of the motor in response to the drive signal and an expected angular position of a rotor of an ideal motor in response to the drive signal.

According to a further embodiment, a method of calibrating a motor is provided. The method comprises controlling a drive signal provided to an EC motor. Further, the method comprises receiving at least one measured angular position of a rotor of the motor in response to the drive signal and determining calibration data based on the at least one measured angular position. The calibration data indicate a relationship between an actual angular position of the rotor of the motor in response to the drive signal and an expected angular position of a rotor of an ideal motor in response to the drive signal.

The above summary is not to be construed as limiting. According to further embodiments of the invention, other devices, systems, or methods may be provided. Such embodiments will be apparent from the following detailed description in connection with the accompanying drawings.

DETAILED DESCRIPTION OF ILLUSTRATIVE EMBODIMENTS

In the following, various embodiments will be described in detail with reference to the accompanying drawings. It should be noted that these embodiments serve only as examples and are not to be construed as limiting. For example, while embodiments with a plurality of features, other embodiments may comprise less features and/or alternative features. Furthermore, features from different embodiments may be combined with each other unless specifically noted otherwise.

Embodiments as illustrated in the following relate to motor controllers, methods of controlling an electronically commutated (EC) motor, and methods of calibrating the motor. The motor may for example be utilized in the automotive field, e.g., for driving a fuel pump or a power steering system. However, it is noted that the illustrated motor, motor controller, system, and methods could also be utilized in various other fields, such as in pumps for home appliances or the like.

In the following, first example motor implementations and deviations between ideal (perfect) motors and real motors will be discussed. After that, techniques for mitigating effects of such deviations according to some embodiments will be described.

Figure 1A:
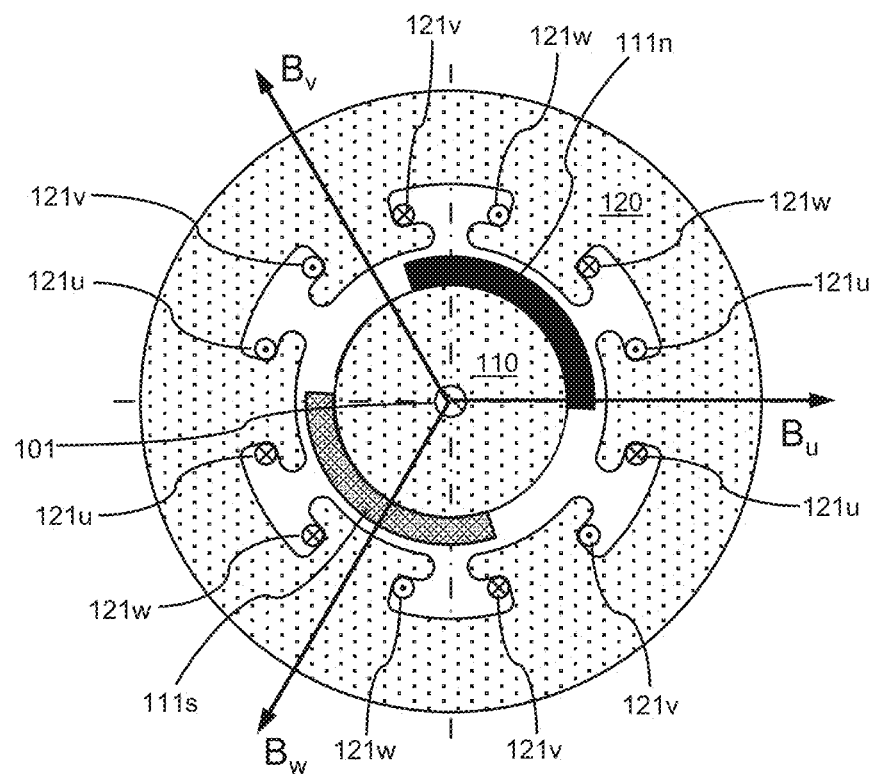
FIG. 1A schematically illustrates an example of an ideal implementation of an EC motor according to an embodiment.

FIG. 1A schematically illustrates an example of an ideal implementation of an EC motor. Specifically, FIG. 1A is a sectional view in a plane perpendicular to a drive shaft 101 of the motor and illustrates an implementation of a rotor 110 and a stator 120 of the motor. The motor is a three-phase motor, with phases being termed as U, V, and W. Stator 120 has three stator segments. A first stator segment of the motor corresponds to the phase U and includes stator windings 121u. A second stator segment of the motor corresponds to the phase V and includes stator windings 121v. A third stator segment of the motor corresponds to the phase W and includes stator windings 121w.

In the illustrated ideal implementation of the motor, the stator segments are arranged in a star-type fashion, with a nominal angular offset of 120° between the different stator segments. The term "nominal" as used herein indicates the way the motor is intended to be by its design. In this case therefore the motor is designed to have offsets of 120°. Accordingly, the motor has a three-fold symmetry with regards to its stator 120. However, it is noted that the concepts as further explained below could also be applied to other motor designs having a different rotational symmetry. In more general terms, the motor may be based on n phases and have an n-fold symmetry with regards to the stator. The n stator segments are then be arranged in a star-type fashion, with a nominal angular offset of 360°/n between the stator segments.

Solid arrows in FIG. 1A indicate directions of magnetic fields provided by the stator segments. Specifically, an arrow denoted by $B_u$ denotes the direction of the magnetic field provided by the stator segment corresponding to the phase U, an arrow denoted by $B_v$ denotes the direction of the magnetic field provided by the stator segment corresponding to the phase V, and an arrow denoted by $B_w$ denotes a direction of a magnetic field provided by the stator segment corresponding to the phase W.

In the illustrated example the rotor 110 includes a single pair of rotor poles 111n, 111s, with a north pole element 111n and a south pole element 111s. The rotor poles 111n, 111s are formed by one or more permanent magnets arranged on the rotor 110, in the following also referred to as rotor magnets. It is noted that higher numbers of pole pairs may be used as well. The rotor 110 with the single pair of rotor poles 11n, 111s has a one-fold rotational symmetry. In the case of n pole pairs, the rotor 110 would have an n-fold rotational symmetry. Since in the example of FIG. 1A the stator 120 has a higher symmetry level than the rotor 110, an overall rotational symmetry of the motor corresponds to that of the stator 120, i.e., is three-fold.

In a real implementation of the motor, there are typically deviations from the ideal implementation as illustrated in FIG. 1A, i.e. from the nominal design. These deviations may specifically concern the stator windings 121u, 121v, 121w and/or the rotor poles 111n, 111s. An example of such deviations is shown in FIG. 1B.

Figure 1B:
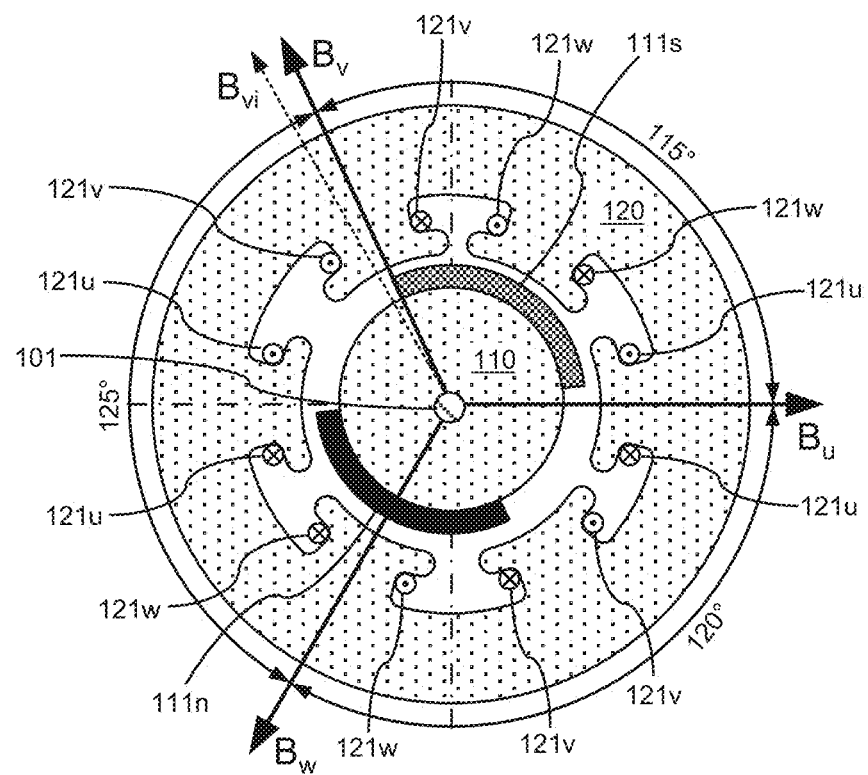
FIG. 1B shows an example of deviations from the ideal implementation of FIG. 1A due to an imperfection of stator windings the motor.

In the example of FIG. 1B, it is assumed that the stator segment corresponding to the phase V is misaligned. This misalignment may be due to an imperfection of the stator windings 121v, e.g., due to a manufacturing error or tolerated variations of manufacturing processes. The imperfections of the stator windings 121v may be due to inhomogeneity of the stator windings 121v, resulting in a by a shift of the mass center of the stator windings 121v over the perimeter of the stator 120.

In the example of FIG. 1B the direction of the magnetic field $B_v$ deviates from an ideal direction of the magnetic field $B_{v,i}$ as expected for the ideal implementation of the motor 100. The misalignment of the stator segment corresponding to the phase V has the effect that compared to the ideal implementation of FIG. 1A the angle between the magnetic field $B_u$ provided by the stator segment corresponding to the phase U and the magnetic field $B_V$ provided by the stator segment corresponding to the phase V is reduced to 115°, whereas the angle between the magnetic field $B_V$ provided by the stator segment corresponding to the phase V and the magnetic field $B_W$ provided by the stator segment corresponding to the phase W is increased to 125°.

In the example of FIG. 1B there is no misalignment of the stator segments corresponding to the phases U and W. However, it is noted that in other scenarios misalignments could also be present for the stator segments of more than one of the phases.

Figure 2A:
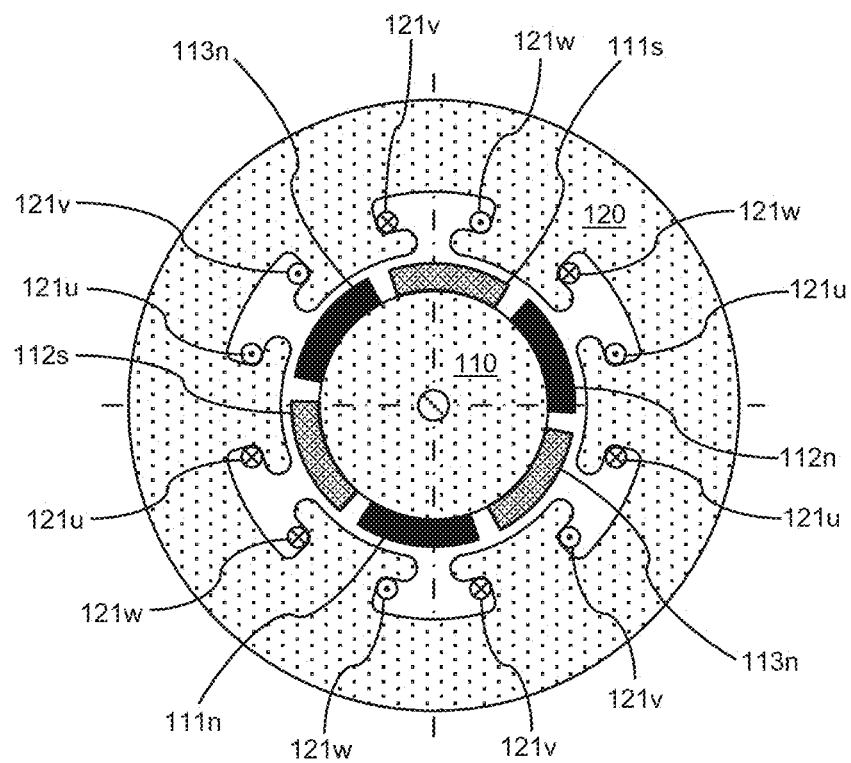
FIG. 2A schematically illustrates a further example of an ideal implementation of an EC motor according to an embodiment.

FIG. 2A schematically illustrates a further example of an ideal implementation of an EC motor. Specifically, FIG. 2A is a sectional view in a plane perpendicular to a drive shaft of the motor and illustrates an implementation of a rotor 110 and a stator 120 of the motor. The implementation of rotor 110 and stator 120 is similar to the example of FIG. 1A. However, in the example of FIG. 2A rotor 110 has multiple pairs of rotor poles 111n, 111s, 112n, 112s, 113n, 113s. A first pair of rotor poles 111n, 111s includes a first north pole element inn and a first south pole element 111s. A second pair of rotor poles 112n, 112s includes a second north pole element 112n and a second south pole element 112s. A third pair of rotor poles 113n, 113s includes a third north pole element 113n and a third south pole element 113s. The rotor poles 111n, 111s, 112n, 112s, 113n, 113s are formed by one or more rotor magnets. Rotor 110 with the three pairs of rotor poles 111n, 111s has a three-fold rotational symmetry.

Figure 2B:
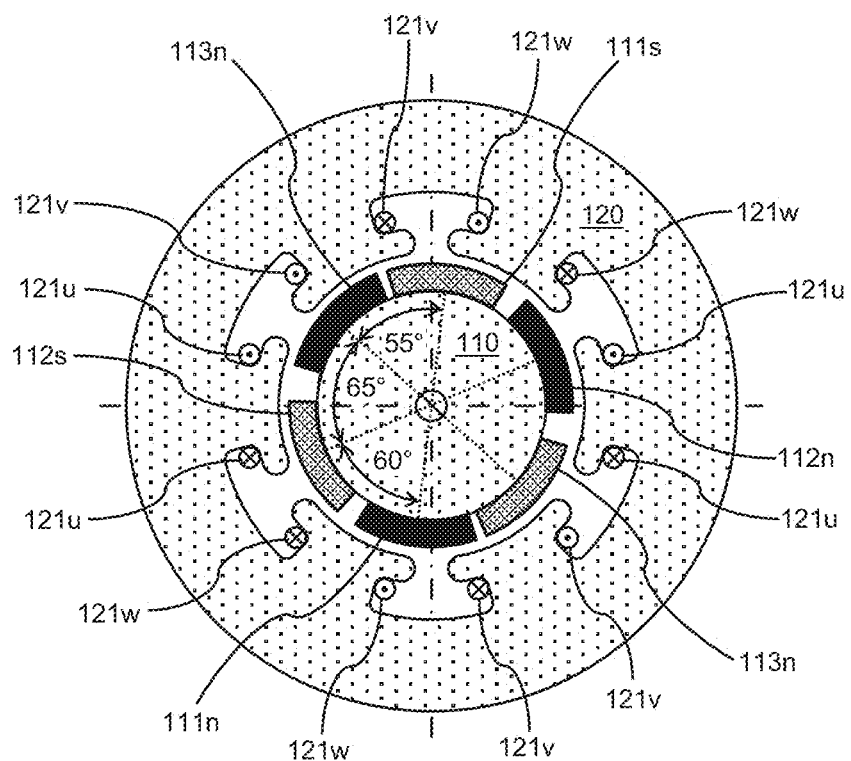
FIG. 2B shows an example of deviations from the ideal implementation due to an imperfection of rotor magnets of the motor.

FIG. 2B shows an example of deviations concerning the rotor poles 111n, 11s, 112n, 112s, 113n, 113s which may occur in a real implementation of the motor.

In the example of FIG. 2B, it is assumed that as compared to the ideal implementation of FIG. 2A the rotor poles 113n, 113s of the rotor 110 are misaligned. Specifically, the example of FIG. 2B assumes that there is an angular shift of the rotor poles 113n, 113s relative to the other rotor poles 111n, 111s, 112n, 112s, e.g., due to a manufacturing error or tolerated variations of manufacturing processes. If the rotor poles 111n, 111s, 112n, 112s, 113n, 113s are formed by separate rotor magnets, the misalignment may be due to an imperfect arrangement of the rotor magnets on the rotor 110 or due to imperfect magnetization of one or more of the rotor magnets. If the rotor poles 111n, 111s, 112n, 112s, 113n, 113s are formed by a single rotor magnet, the misalignment may be due to an imperfect magnetization of the rotor magnet or due to an imperfect shape of the rotor magnet.

In the example of FIG. 2B the relative angular shift of the rotor poles 113n, 113s is assumed to be 5°, with the result that an angle between a magnetic field direction of the rotor poles 113n, 113s and a magnetic field direction of the rotor poles 11n, ins is reduced to 55° while an angle between the magnetic field direction of the rotor poles 113n, 113s and a magnetic field direction of the rotor poles 112n, 112s is increased to 65°.

Figure 3A:
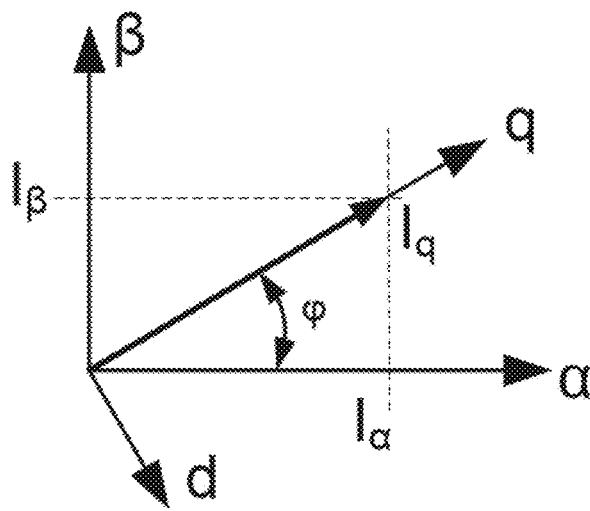
FIGS. 3A and 3B illustrate effects of the imperfection of the stator windings and/or rotor magnet(s) of the motor.
Figure 3B:
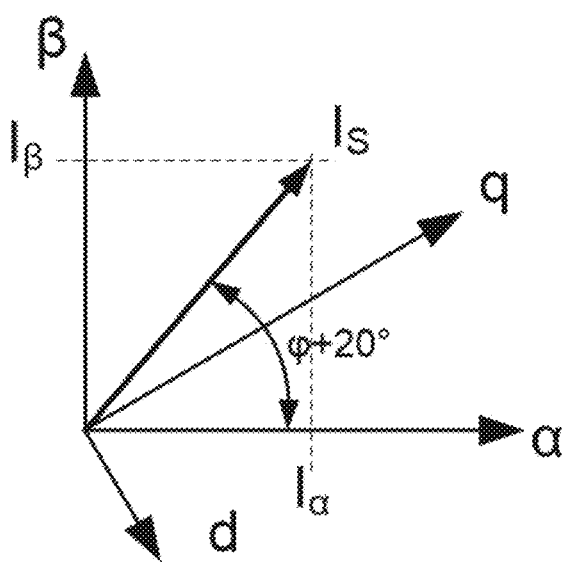

FIGS. 3A and 3B further illustrate effects of a misalignment of stator windings like explained in the example of FIG. 1B or a misalignment of rotor poles like explained in the example of FIG. 2B. Specifically, FIG. 3A illustrates generation of torque on the rotor 110 when assuming the perfect implementation of the motor, without any misalignment of stator windings or any misalignment of rotor poles. FIG. 3B illustrates generation of torque in a scenario with a misalignment of the stator windings or rotor poles.

In the examples of FIGS. 3A and 3B, it is assumed that during operation of an EC motor as discussed above with reference to FIGS. 1 and 2 a drive signal is supplied to the motor. The drive signal has three components: a first component corresponding to a current $I_U$ through the stator windings 121u of the phase U, a second component corresponding to a current Iv through the stator windings 121v of the phase V, and a third component corresponding to a current $I_W$ through the stator windings 121w of the phase W. A stator magnetic field is illustrated as a stator current vector $I_S$ in a two-dimensional representation. The stator magnetic field corresponds to the sum of the magnetic fields $B_u$, $B_v$, $B_w$ provided by the individual stator segments. The stator current vector is represented using two orthogonal stator current coordinates denoted by $I_\alpha$ and $I_\beta$. The two orthogonal stator current coordinates $I_\alpha$ and $I_\beta$ are derivable by a coordinate transformation from the three components $I_U$, $I_V$, $I_W$ of the drive signal. The example of FIGS. 3A and 3B further assumes that the drive signal is generated with the aim of generating a maximum torque on the rotor 110 of the motor.

Further, FIGS. 3A and 3B illustrate the orientation of the rotor 110 by showing a vector d representing a direct (d) axis of the rotor 110, i.e., a direction of magnetic flux produced by the rotor 110, and a vector q representing a torque (q) axis of the rotor 110, which is perpendicular to the d axis. As can be seen, in the example of FIG. 3A the stator current vector $I_S$ is aligned with the vector q, which means that the torque on the rotor 110 is maximized. As compared to that, in the scenario of FIG. 3B there is a misalignment of the direction of the stator current vector $I_S$ with respect to the direction of the vector q, which means that the torque generated on the rotor 110 is reduced as compared to the scenario of FIG. 3A. In the case of an angular misalignment of 20° as illustrated in the example of FIG. 3B, the torque would be reduced by 10% as compared to the example of FIG. 3A.

The misalignment in the example of FIG. 3B may result from a deviation of the orientation of the stator magnetic field from an orientation as expected for the ideal motor implementation and/or a result of a deviation of the orientation of the rotor magnetic field as expected for the ideal motor implementation.

As illustrated by the example of FIG. 2A, a certain stator segment may cover a different angular region than in the ideal motor implementation. Further, such deviation of angular coverage may vary from one stator segment to another. For example, an angular offset between the magnetic fields provided by two neighboring stator segments may be larger than assumed for the ideal implementation of the motor, like in the example of FIG. 2B between the stator segment corresponding to the phase V and the stator segment corresponding to the phase W. Between these stator segments the rotation of the stator magnetic field will be faster than assumed for the ideal implementation of the motor 100. Further, an angular offset between the magnetic fields provided by two neighboring stator segments may be smaller than assumed for the ideal implementation of the motor, like in the example of FIG. 2B between the stator segment corresponding to the phase V and the stator segment corresponding to the phase U. Between these stator segments the rotation of the stator magnetic field will be slower than assumed for the ideal implementation of the motor. Accordingly, even if the rotor 110 rotates with a constant angular velocity and the drive signal supplied to the stator is generated in accordance with this rotation of the rotor 110, the stator magnetic field will rotate with an angular velocity which is non-constant over one revolution of the rotor. The differences in angular velocity between the stator magnetic field and the rotor 110 in turn may lead to angular position dependent changes of the angle of the stator magnetic field with respect to the rotor magnetic field of the rotor magnets. As explained in connection with FIGS. 3A and 3B, this causes variations of the torque on the rotor 110. These variations reoccur with each revolution of the rotor 110, i.e., cause torque ripple.

Similar problems as explained above for the case of imperfect stator windings may also occur in the case of imperfections of the rotor magnets, e.g., if the shape, position, or magnetization of one or more rotor magnets deviates from the ideal motor implementation. This may have the effect that the rotor magnetic field has an imperfect geometry which deviates from a geometry assumed for the ideal implementation of the motor 100. Even if the stator windings 121u, 121v, 121w are perfect and the stator magnetic field rotates synchronously with the rotor 110, the imperfect geometry of the rotor magnetic field may have the effect that over one revolution of the rotor a certain rotor pole passes a certain stator segment earlier or later than expected for the ideal implementation of the motor. When for example referring to the example of FIG. 2B and assuming a clockwise rotation of the rotor 110, the pair of the rotor poles 113n, 113s will pass the stator segments earlier than expected for the ideal implementation of the motor. This causes angular position dependent changes of the angle of the stator magnetic field with respect to the rotor magnetic field and corresponding variations of the torque on the rotor. Accordingly, torque ripple may also arise due to imperfections of the rotor magnets.

In order to efficiently take into account imperfections of the motor like explained in connection with FIGS. 1A to 3B, the concepts as illustrated below involve calibrating the motor with the aim of at least partially compensating a misalignment of the relative orientations of the stator magnetic field and the rotor magnetic field. Specifically, the motor is operated on the basis of calibration data which indicate a relation of an actual angular position of the rotor 110 in response to the drive signal and an expected angular position of the rotor 110 as expected for the ideal implementation of the motor in response to the drive signal. Accordingly, the calibration data describe how a response of the motor to the drive signal deviates from a response as expected for the ideal implementation of the motor. As explained in more detail below, the calibration data may be used to correct a dependency of the drive signal on the angular position of the rotor 110.

Figure 4:
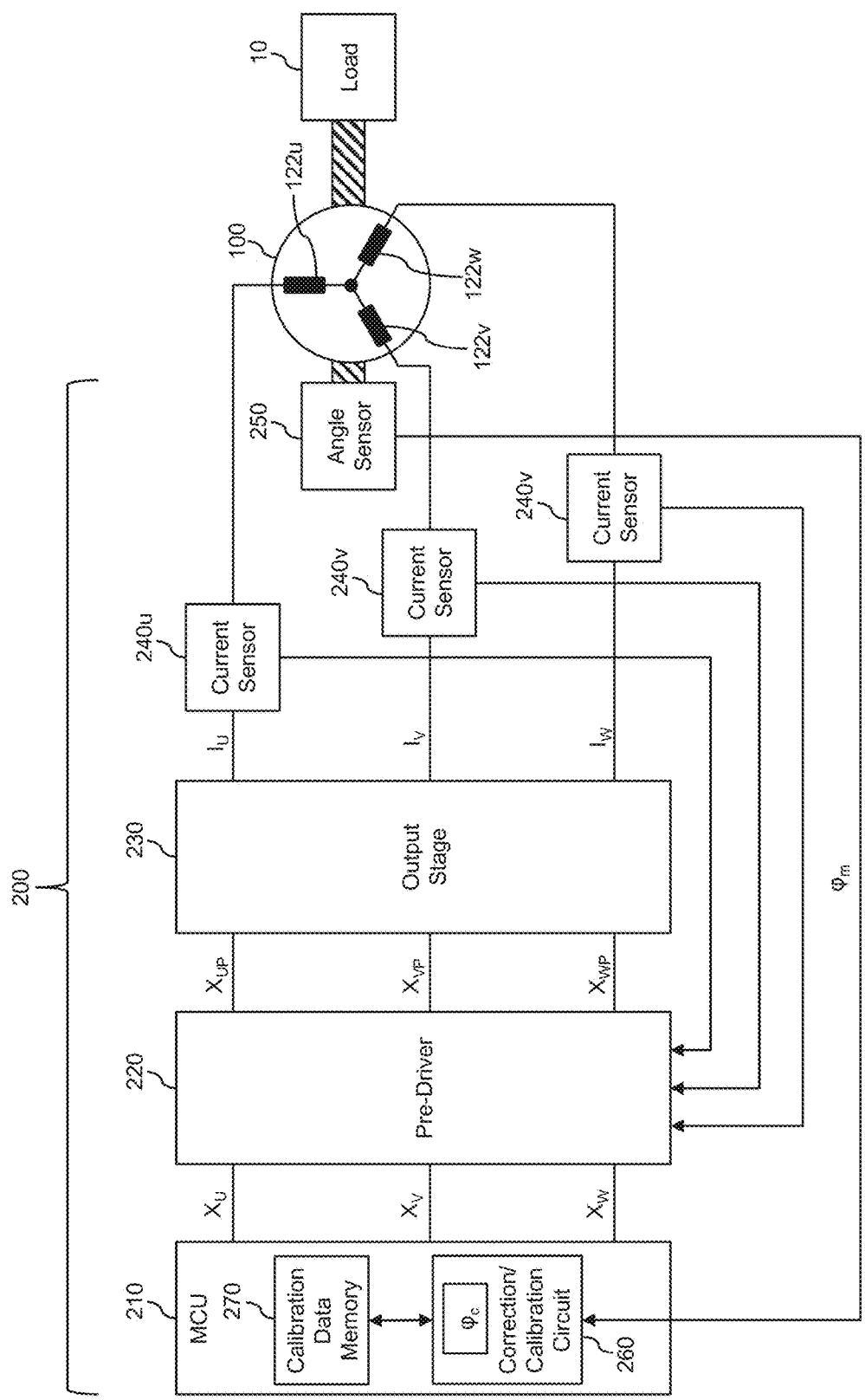
FIG. 4 schematically illustrates a motor system according to an embodiment.

FIG. 4 schematically illustrates a motor system in which compensation of imperfections of the motor is implemented according to an embodiment. The motor system includes a motor 100. Motor 100 may be based on an ideal implementation as illustrated in FIG. 1A or on an ideal implementation as illustrated in FIG. 2A. Motor 100 may have imperfections of stator windings, e.g., as explained in connection with FIG. 1A, and/or imperfections of one or more rotor magnets, e.g., as explained in connection with FIG. 2B.

In the example of FIG. 4, motor 100 is used to drive a load 10. In the automotive field, load 10 may for example be a pump, e.g., a fuel pump or an oil pump (not shown in FIG. 3). Further, load 10 could be a shaft of a power steering system (not shown in FIG. 3). Further, the motor system includes a motor controller 200 which provides the drive signals to motor 100.

As mentioned above, the drive signal has three components, also referred to as phases. Each of these drive signal components is supplied to a respective one of the stator segments of the motor 100, in FIG. 4 denoted by 122u, 122v, 122w. The stator segment 122U corresponding to the phase U is supplied with a drive signal component corresponding to the phase U, namely a current $I_U$. The stator segment 122v corresponding to the phase V is supplied with a drive signal component corresponding to the phase U, namely a current $I_V$. The stator segment 122w corresponding to the phase W is supplied with a drive signal component corresponding to the phase W, namely a current $I_W$.

In the illustrated example, the motor controller 200 includes a microcontroller 210, a pre-driver 220, an output stage 230, a respective current sensor 240u, 240v, 240w for each of the drive signal components $I_U$, $I_V$, $I_W$, and an angle sensor 250 for sensing the angular position of the rotor 110 (not shown in FIG. 4, but illustrated in FIGS. 1 and 2). Angle sensor 250 may for example be based on one or more Hall devices, on one or more Giant Magneto-Resistance (GMR) devices, on one or more Tunneling Magneto-Resistance (TMR) devices, on a mechanical encoder, a magnetic resolver, or the like, as known to a person of ordinary skill in the art.

As further explained below, angle sensor 250 may be capable of unambiguously resolving the angular position of the rotor 110 over a full rotation of the rotor 110. In other words, the angular position of the rotor may be unambiguously determined over a full rotation of rotor 110. The angular position of the rotor 110 as measured by the angle sensor 250 is in the following also referred to as measured rotor angle φm. As explained in more detail below, the motor controller 200 may generate the drive signal components $I_U$, $I_V$, $I_W$ as a function of the measured rotor angle φm.

As illustrated, the microcontroller 210 uses the measured rotor angle $\varphi_m$ (also referred to as measured angular position) as an input parameter for generating a corresponding control signal $X_U$, $X_V$, $X_W$ for each of the phases U, V, W. The control signals $X_U$, $X_V$, $X_W$ may indicate a respective target value for each of the drive signal components $I_U$, $I_V$, $I_W$. The measured rotor angle $\varphi_m$ is used for controlling these target values to achieve a rotation of a current vector formed of the drive signal components $I_U$, $I_V$, $I_W$.

As further illustrated, the pre-driver stage 220 may use feedback from the current sensors 240 for accurately controlling the drive signals $I_U$, $I_V$, $I_W$ to the target values. In this way, for example delays caused by inductances of the stator windings 121u, 121v, 121w may be taken into account. Output signals of the pre-driver stage 220 for the phases U, V, W are denoted by $X_{UP}$, $X_{VP}$, $X_{WP}$, respectively. The output stage 230 may in turn be used for amplifying the output signals $X_{UP}$, $X_{VP}$, $X_{WP}$ of the pre-driver stage 220 to a required power level, thereby obtaining the drive signal components $I_U$, $I_V$, $I_W$.

For compensation of misalignments of the orientation of the stator magnetic field relative to the rotor magnetic field the motor controller 200 is provided with a correction/calibration circuit 260 and a calibration data memory 270. The calibration data memory 270 stores the above-mentioned calibration data which indicate a relationship between the actual angular position of the rotor 110 in response to the drive signal and the expected angular position (i.e. angular position of an ideal motor) of the rotor 110 in response to the drive signal. In the example of FIG. 4 the correction circuit 260 uses the calibration data stored in the calibration data memory 270 to calculate a corrected angular position $\varphi_c$ of the rotor 110 from the measured rotor angle $\varphi_m$. Based on the corrected angular position $\varphi_c$ the motor controller 200 then generates the drive signal for the motor 100, e.g., using a vector control algorithm discussed below in which the stator magnetic field caused by the drive signal is rotated according to the corrected angular position $\varphi_c$.

Figure 5:
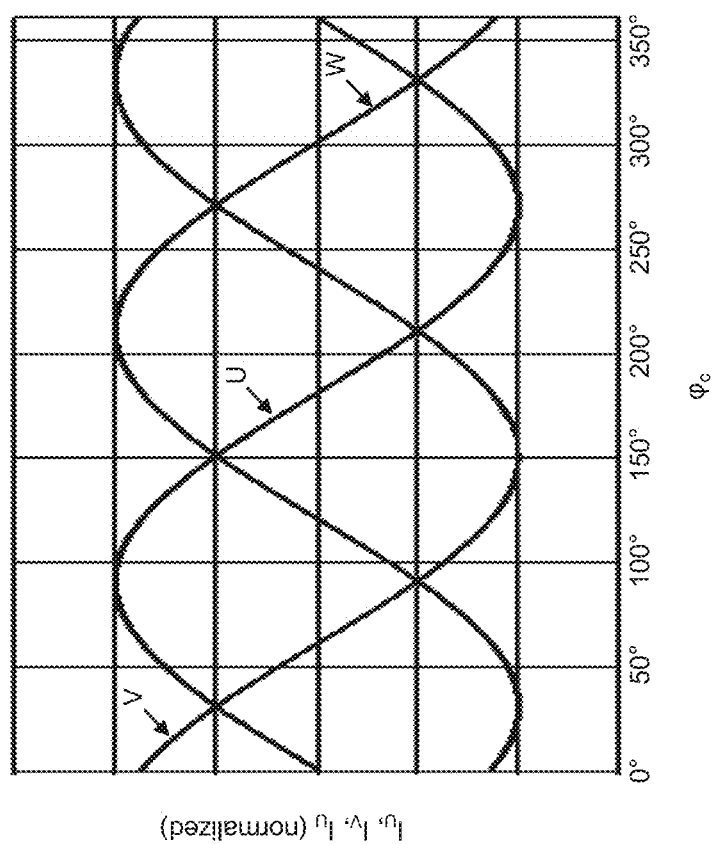
FIG. 5 schematically illustrates drive signals as generated in the motor system of FIG. 4.

FIG. 5 schematically illustrates the drive signal components $I_U$, $I_V$, $I_W$ generated by the motor controller 200. Here, it is noted that in FIG. 5 any changes to the drive signal introduced by pre-driver stage 220 have been omitted for the sake of clarity.

As can be seen, in the illustrated example the drive signal components $I_U$, $I_V$, $I_W$, are each based on a sinusoidal function of the corrected angular position $\varphi_c$ of the rotor 110 and are phase shifted with respect to each other by 120°. For example, the drive signals may be represented as follows:

$$I\_U = A \sin(\varphi\_c), \quad (1)$$

$$I\_V = A \sin(\varphi\_c + 120°), \text{ and} \quad (2)$$

$$I\_W = A \sin(\varphi\_c + 240°), \quad (3)$$

where A denotes an amplitude parameter which may be controlled by microcontroller 210, pre-driver 220, and output stage 230.

While the rotor 110 is rotating, the motor controller 200 continuously adjusts the drive signal components $I_U$, $I_V$, $I_W$, depending on the measured rotor angle $\varphi_m$ as measured by the angle sensor 250, in particular depending on the corrected angular position $\varphi_c$ calculated from the measured rotor angle $\varphi_m$.

The dependency of the drive signal on the corrected angular position $\varphi_c$ provides a rotation of the stator magnetic field which is synchronous with a rotation of the rotor magnetic field. The correction of the measured angular position $\varphi_c$ on the basis of the calibration data at least partially compensates misalignments due to imperfections of stator windings or rotor magnets. In this way, it can be achieved that the stator magnetic field has an orientation which is aligned along the q axis of the rotor 110. In this way, torque on the rotor 110 may be maximized.

Figure 6:
FIG. 6 schematically illustrates an example of calibration measurements according to an embodiment.
Figure 6:
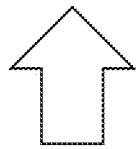
Figure 6:
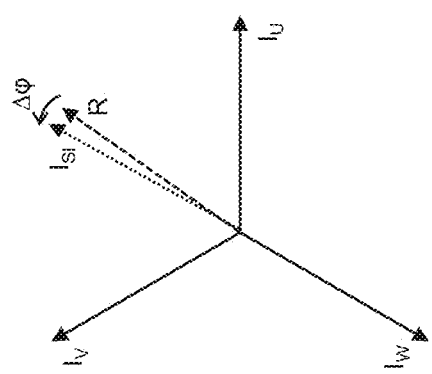

FIG. 6 shows a setup which may be used for the calibration procedure and exemplary calibration results according to an embodiment, i.e. an example how to obtain the calibration data. During the calibration procedure, the drive signal is applied to the motor 100 and the rotor angle $\varphi_m$ reached by the rotor 110 in response to a particular state of the drive signal is measured using angle sensor 250. An angular misalignment $\Delta\varphi$ may then be determined as a difference between an expected angular position $\varphi_e$ and the actually measured rotor angle $\varphi_m$. The expected angular position $\varphi_e$ corresponds to an angular position expected for the rotor 110 in response to the state of the drive signal when assuming the ideal implementation of the motor 100.

In FIG. 6, the expected angular position $\varphi_e$ is illustrated by an orientation of the stator current vector $I_{SI}$ as assumed for the ideal implementation of the motor 100. The actually measured rotor angle $\varphi_m$ is illustrated by a vector R. These measurements may be performed for various states of the drive signal, where each state of the drive signal corresponds to a different expected angular position $\varphi_e$ and causes the rotor 110 to reach a different actually measured rotor angle $\varphi_m$. The angular misalignment $\Delta\varphi$ may thus be determined as a function of the measured rotor angle $\varphi_m$.

As can be seen from the exemplary calibration results of FIG. 6, which assume a 5° misalignment of the phase V, the angular misalignment $\Delta\varphi$ varies depending on the measured rotor angle $\varphi_m$. The results of the calibration procedure may for example be stored in the form of a lookup table 600 in the calibration data memory 270, for later usage by the correction circuit 260 when generating the drive signal during regular operation of the motor 100. Specifically, the calibration data may indicate the angular misalignment $\Delta\varphi$ as a function of the measured rotor angle $\varphi_m$. In the stored calibration data the measured rotor angles $\varphi_m$ correspond to actual angular positions of the rotor in response to the drive signal, while the angular misalignment $\Delta\varphi$ or the expected rotor angle $\varphi_e$ indicates the relationship of these actual angular positions to the expected angular position of the rotor 110 in response to the drive signal.

During the calibration procedure, the applied states of the drive signal $I_U$, $I_V$, $I_W$ may correspond to basic vectors for which at least one of the drive signal components $I_U$, $I_V$, $I_W$ is zero, whereas the other drive signals $I_U$, $I_V$, $I_W$ have the same value, e.g., a unitary value. When normalizing the drive signal components $I_U$, $I_V$, $I_W$, these basic vectors would thus be (1,0,0), (1,1,0), (0,1,0), (0,1,1), (0,0,1), and (1,0,1). For the ideal motor implementation, these basic vectors would correspond to expected rotor angles of 0°, 60°, 120°, 180°, 240°, and 360°, respectively. During the calibration procedure, the drive signals may be applied in static manner, with the rotor 110 of the motor 100 being free to move. In response to a given state of the drive signals $I_U$, $I_V$, $I_W$, the rotor 110 will move into a position in which the orientation of the stator magnetic field is aligned with the d axis of the rotor 110. However, the orientation of the stator current vector $I_S$ may deviate from the measured orientation of the rotor 110. This may be accomplished in a step wise manner over one full revolution of the rotor.

In the example of FIG. 6, the angular misalignments $\Delta\varphi$ are measured for six different states of the drive signal, i.e., for six different angular positions. This may allow for precisely assessing the misalignments for a motor implementation with a three-fold symmetry, like illustrated in the examples of FIGS. 1A and 2A.

It is noted that the calibration procedure is not limited to using statically applied basic vectors. Rather, it is also be possible to generate the drive signal with states corresponding to other expected angular positions $\varphi_e$ of the rotor 110, e.g., according to:

$$I_U = A \sin(\varphi_e - 90°), \quad (4)$$

$$I_V = A \sin(\varphi_e + 30°), \text{ and} \quad (5)$$

$$I_W = A \sin(\varphi_e + 150°). \quad (6)$$

Accordingly, the sets of the drive signal used during calibration may also be generated on the basis of similar algorithms as used for generating the drive signal during operation of the motor 100, however with a phase shift of 90° to take into account that for a statically applied state of the drive signal the d axis of the rotor 110 will align with the stator magnetic field, while during regular operation of the motor 100 the drive signal would typically be generated with the aim of aligning the stator magnetic field with the q axis of the rotor 110.

During calibration, the angular misalignment $\Delta\varphi$ may be measured for multiple angular positions of the rotor 110, which are distributed over a full rotation of the rotor 110. Intermediate values of the angular misalignment $\Delta\varphi$ may then for example be obtained by an approximation function, e.g., by interpolation or extrapolation. Here, it is noted that such approximation function could be used to provide the calibration data also for rotor angles which are different from the rotor angles $\varphi_m$ measured during calibration. For example, by interpolating or extrapolating the data shown in the lookup table, calibration data could also be provided for rotor angles in the intervals between the measured rotor angles $\varphi_m$. In addition or as an alternative, an approximation function could also be used during operation of the motor 100 to calculate the corrected rotor angle $\varphi_c$ for a measured rotor angle $\varphi_m$ which is different from the actual rotor angles $\varphi_m$ included in the calibration data.

Next, use of the calibration data during normal operation of motor 100 will be discussed in more detail. During operation of motor 100, the calibration/correction circuit 260 may use the calibration data to calculate a corrected angular position from the currently measured rotor angle $\varphi_m$. Specifically, the calibration/correction circuit 260 may use the angular misalignment $\Delta\varphi$ mapped to a given measured rotor angle $\varphi_m$ to calculate the corrected angular position $\varphi_c$ according to:

$$\varphi_c = \varphi_m + \Delta\varphi(\varphi_m). \quad (7)$$

Rather than calculating the corrected angular position $\varphi_c$ by adding the compensation angle according to relation (7) similar to it would also be possible that the calibration data indicate the expected angular positions $\varphi_e$ mapped to the measured rotor angles $\varphi_m$, and to calculate the corrected angular position $\varphi_c$ based on this mapping. In this case the expected angular position $\varphi_e$ could be used directly as the corrected angular position pc.

If during operation of the motor 100 the currently measured rotor angle $\varphi_m$ differs from the measured rotor angles $\varphi_m$ considered in the calibration data, the correction/calibration circuit 260 may select that one of the angular misalignments $\Delta\varphi$ which corresponds to that measured rotor angle $\varphi_m$ considered in the calibration data which best matches the currently measured rotor angle considered in the calibration data. If for example the currently measured rotor angle is $\varphi_m = 60°$, the correction/calibration circuit 260 may select the angular misalignment $\Delta\varphi$ corresponding to $\varphi_m = 57.5°$ from the stored calibration data and calculate the corrected rotor angle $\varphi_c$ based on the currently measured rotor angle $\varphi_m$ and the selected best matching angular misalignment $\Delta\varphi$. Furthermore, an approximation function may be used, which will be explained next.

Figure 7:
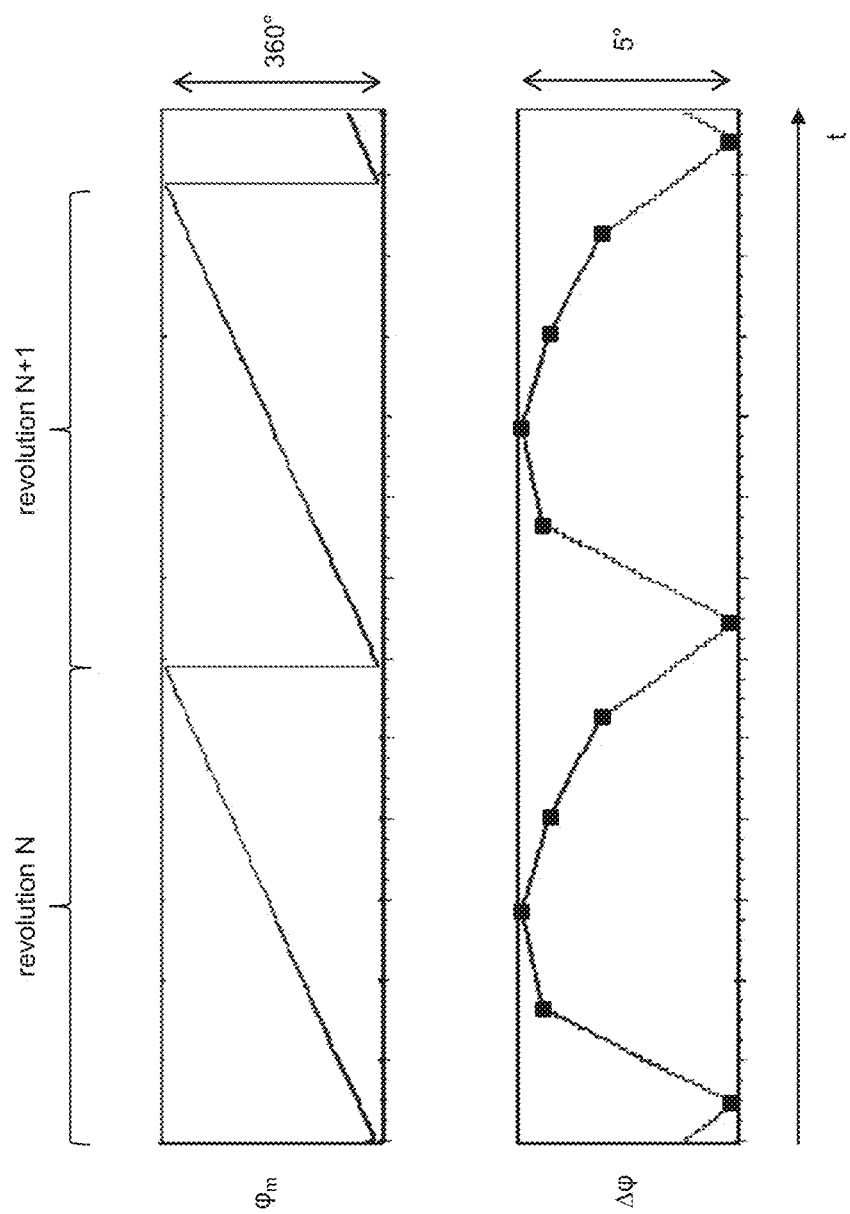
FIG. 7 shows an example of calibration data as used according to an embodiment of the invention, the calibration data including a compensation angle $\Delta\varphi$ depending on a measured rotor angle $\varphi_m$.

FIG. 7 shows an example of using linear interpolation between measured values of the angular misalignment $\Delta\varphi$ to thereby obtain an estimate of the angular misalignment $\Delta\varphi$ for any measured rotor angle $\varphi_m$. In the example of FIG. 7, values of the angular misalignment $\Delta\varphi$ for rotor angles $\varphi_m$ which were measured during calibration are denoted by solid boxes. For other rotor angles $\varphi_m$, the angular misalignment $\Delta\varphi$ may be estimated on the basis of linear interpolating functions between these values. Here, it is noted that other kinds of approximating functions could be used as well, e.g., a sinusoidal approximation to the data measured during calibration.

Figure 8:
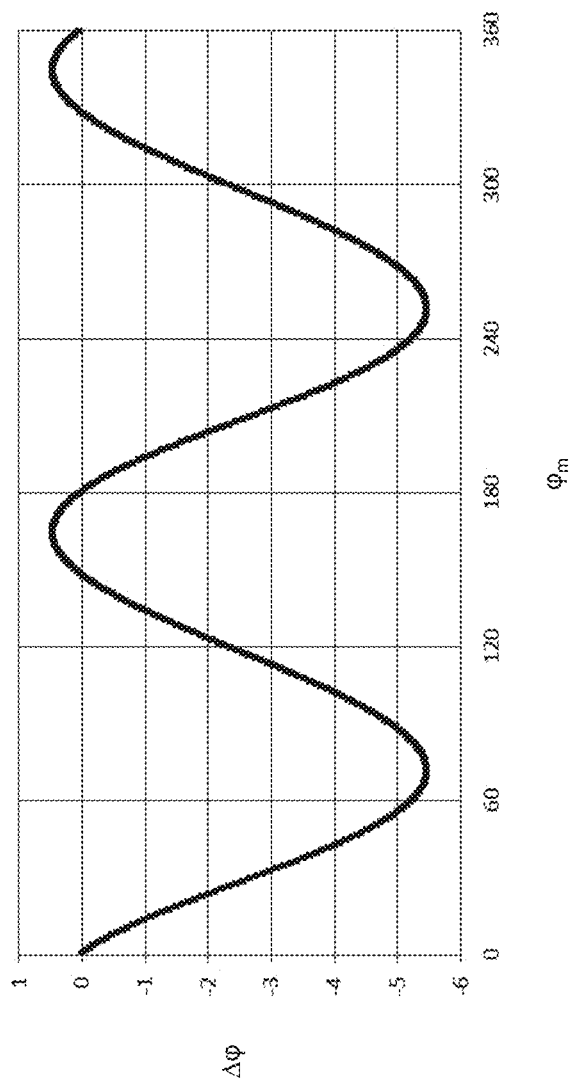
FIG. 8 shows a further example of calibration data as used according to an embodiment.

Further, the calibration may also utilize a very fine granularity of measurements of the angular misalignment $\Delta\varphi$, e.g., by using measurements with based on states of the drive signal corresponding to a small step size of 1° or even less for the expected rotor angle $\varphi_e$. A corresponding example of a fine granularity mapping is shown in FIG. 8, where the angular misalignment $\Delta\varphi$ varies smoothly in a sinusoidal manner as a function of the measured rotor angle $\varphi_m$.

The calibration and compensation of misalignments can also be done for implementations of the motor 100 with more than two pairs of rotor poles, such as in the example of FIGS. 2A and 2B. In this case, one full mechanical rotation of the rotor 110 will correspond to n full rotations of the stator current vector Is. This may be considered by defining an electrical rotor angle $\varphi_m$ which corresponds to n times the measured mechanical rotor angle $\varphi_m$, and a corresponding expected electrical rotor angle $\varphi_c$ which corresponds to n times the expected mechanical rotor angle $\varphi_e$.

Figure 9:
FIG. 9 shows a further example of results of calibration measurements according to an embodiment.

FIG. 9 shows an example of calibration results for a scenario which assumes three pairs of rotor poles. In this case, it can be distinguished between an expected mechanical rotor angle $\varphi_e$ and an expected electrical rotor angle $\Phi_e$, which is three times the expected mechanical rotor angle $\varphi_e$ (modulo 360°). Further, a measured electrical angle $\Phi_e$ can be defined as corresponding to three times the measured mechanical rotor angle $\varphi_m$ (modulo 360°). Still further, an electrical angular misalignment $\Delta\Phi$ can be defined as corresponding to three times the mechanical angular misalignment $\Delta\varphi$.

As can be seen from the example of FIG. 9, over a full mechanical rotation of the rotor 110, there are three rotations of the electrical rotor angles $\Phi_e$, $\Phi_m$ and of the stator current vector $I_S$ defined by the drive signal components $I_u$, $I_v$, $I_w$. In FIG. 9, these repetitive patterns of the electrical rotor angles $\Phi_e$, $\Phi_m$ and of the stator current vector $I_S$ are separated by dashed lines. In the example of FIG. 9, over one mechanical rotation of the rotor 110 the angular misalignment $\Delta\varphi$ shows a different characteristic for each of the rotations of the electrical rotor angles $\Phi_e$, $\Phi_m$ and of the stator current vector Is. This may be due to a misalignment of rotor pole pairs like illustrated in the example of FIG. 2B. These variations within one mechanical rotation of the rotor 110 can be efficiently taken into account if during calibration of the motor 100 the measured rotor angle $\varphi_m$ is uniquely resolved over one mechanical rotation of the rotor 110.

Figure 10:
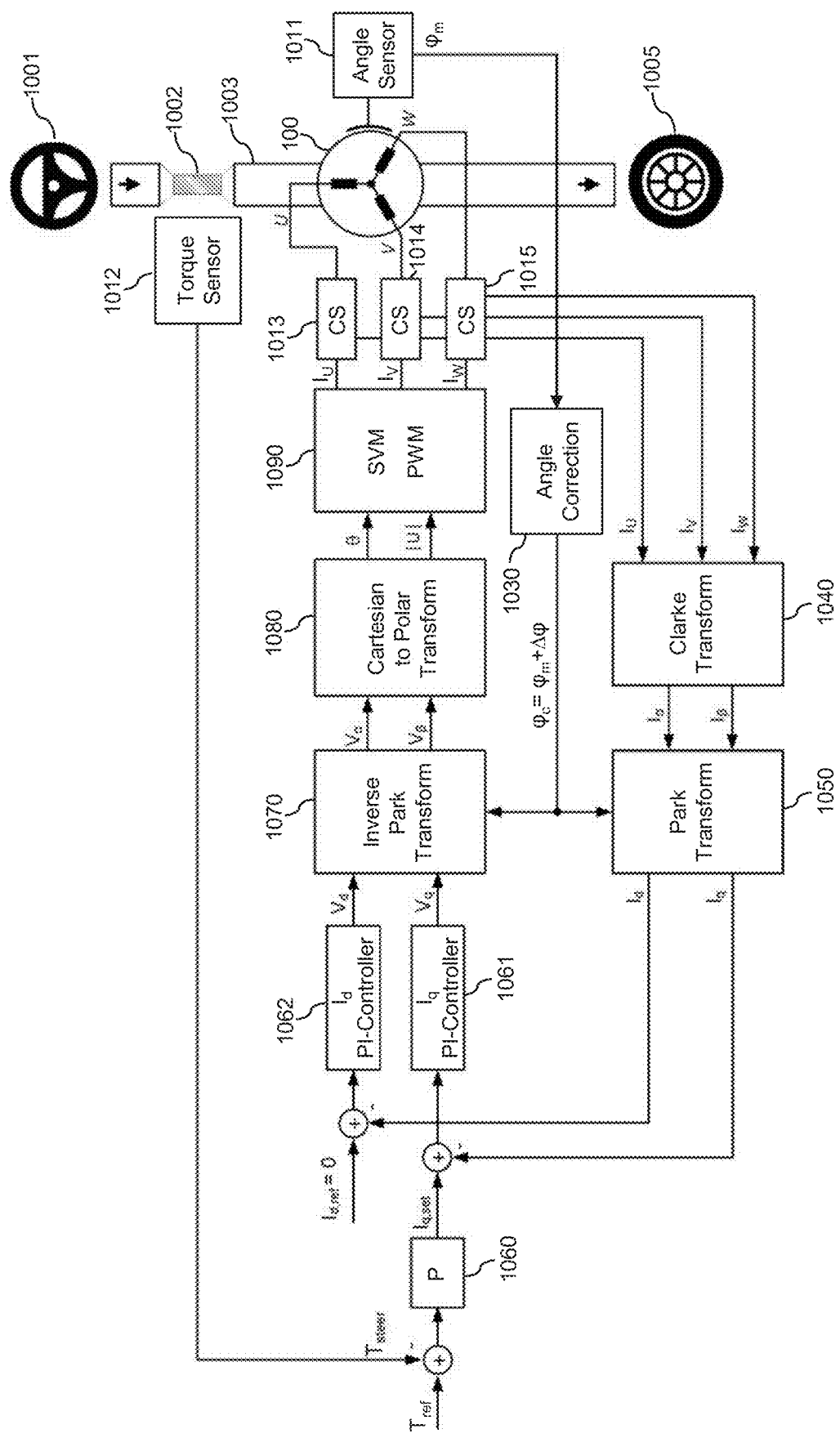
FIG. 10 illustrates further details of motor control according to an embodiment.

FIG. 10 shows a block diagram for further illustrating motor control according to an embodiment. In particular, FIG. 10 illustrates a vector control circuit which may be used to generate the drive signal for motor 100. In the example of FIG. 10, it is assumed that the motor 100 is part of a power steering system. As schematically illustrated, the power steering system includes a steering wheel 1001 which is connected via a torsion bar 1002 to a steering shaft 1003 used to control at least one steered wheel 1005 of a vehicle. Motor 100 is used for providing additional power to the steering shaft 1003. In the example of FIG. 10, the motor 100 is controlled as explained above on the basis of the measured rotor angle $\varphi_m$. The rotor angle $\varphi_m$ is measured by an angle sensor 1011. Further, the motor 100 is controlled on the basis of a torque demand $T_{steer}$ as provided by a torque sensor 1012 coupled to the steering wheel 1001 and on the basis of current feedback as provided by current sensors 1013, 1014, 1015 which sense the electrical current of the drive signal components $I_U$, $I_V$, $I_W$, respectively.

As illustrated, during operation of the motor 100 the currently measured rotor angle $\varphi_m$ is supplied to an angle correction block 1030. Using the results of a calibration procedure as explained above, the angle correction block 1030 calculates the corrected rotor angle $\varphi_c$ from the measured rotor angle $\varphi_m$. This may be accomplished on the basis of equation (7), by adding the compensation angle $\Delta\varphi$ mapped to the measured rotor angle $\varphi_m$.

In the vector control circuit of FIG. 10, the measured electrical currents are supplied to a Clarke transform block 1040, which accomplishes conversion from a three dimensional coordinate space to a two dimensional coordinate space, using two orthogonal coordinates $I_\alpha$ and $I_\beta$. The orthogonal coordinates $I_\alpha$ and $I_\beta$ are supplied to a Park transform block 1040, which uses the corrected rotor angle $\varphi_c$ as input and accomplishes conversion of the coordinates $I_\alpha$ and $I_\beta$ to a coordinate system rotated by the corrected rotor angle $\varphi_c$. As a result, the Park transformation block provides a first coordinate $I_d$ aligned with the d axis of the rotor and a second coordinate $I_q$ aligned with the q axis of the rotor 110.

The coordinates $I_d$ and $I_q$ are then used as feedback in a control algorithm which is based on an outer control block 1060, a PI (Proportional Integral) control block 1061 for the $I_q$ coordinate, and a PI control block 1062 for the $I_d$ coordinate. The outer control block 1060 uses the difference between the torque demand $T_{steer}$ and a reference torque $T_{ref}$ (e.g., of $T_{ref}=0$) as input for setting a target value $I_{q,set}$ for the $I_q$ coordinate. The PI control block 1061 for the $I_q$ coordinate uses the difference between the target value $I_{q,set}$ for the $I_q$ coordinate and the feedback for the $I_q$ coordinate to set a corresponding output voltage $V_q$. The PI control block 1062 for the $I_d$ coordinate uses the difference between a target value $I_{d,set}$ for the $I_d$ coordinate and the feedback for the $I_d$ coordinate to set a corresponding output voltage $V_d$. In view of keeping the stator field vector aligned with the q axis of the rotor, the target value $I_{d,set}$ is zero. The output voltages $V_d$ and $V_q$ are defined in a coordinate system which rotates according to the corrected rotor angle $\varphi_c$.

The output voltages $V_d$ and $V_q$ of the PI control blocks 1061, 1062 are supplied to an inverse Park transform block 1070 which accomplishes conversion to non-rotating coordinates $V_\alpha$ and $V_\beta$. Similar to the Park transform block 1040, the inverse Park transform block 1070 uses the corrected rotor angle $\varphi_c$ as input. The operation of the inverse Park transform block 1070 introduces the above-mentioned sinusoidal variation of the drive signal components $I_U$, $I_V$, $I_W$.

The coordinates $V_\alpha$ and $V_\beta$ are supplied to a cartesian to polar transform block 1080, which provides output signals in polar coordinates $\Theta$ and $|U|$ used as input of an SVM (Space Vector Modulation) and PWM (Pulse Width Modulation) block 1090 which outputs the drive signals $I_U$, $I_V$, $I_W$ for the motor 100. If the SVM/PWM block 1080 can use cartesian coordinates as input, the cartesian to polar transform block 1080 could also be omitted. Due to the angle correction block 1030, the drive signals $I_U$, $I_V$, $I_W$ cause the stator magnetic field to rotate synchronously with the rotor magnetic field, irrespective of a possible misalignment of stator windings or rotor poles.

Figure 11A:
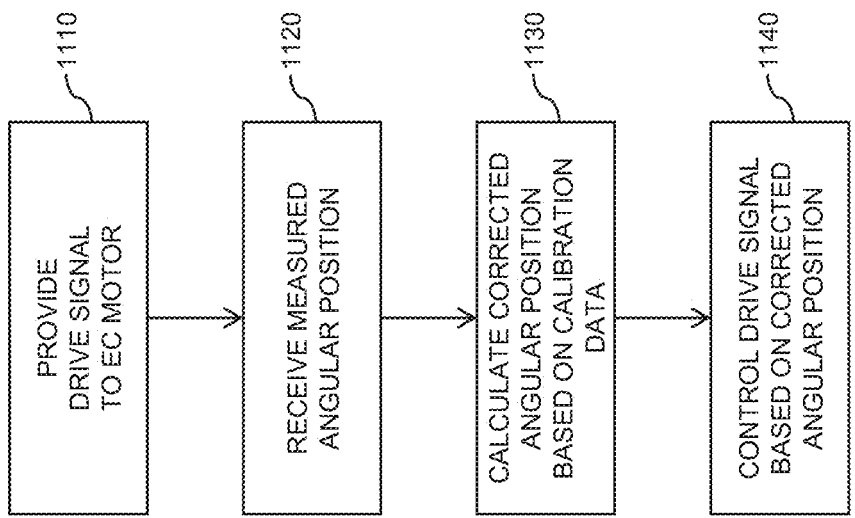
FIG. 11A shows a flowchart for schematically illustrating a method of controlling a motor according to an embodiment.

FIG. 11A shows a flowchart for illustrating a method which may be used for operating an EC motor based on the concepts as described in the foregoing. The EC motor may for example correspond to the above-mentioned motor 100. The method of FIG. 11A may be performed by a motor controller, such as the above-mentioned motor controller 200.

At 1110, a drive signal is provided to the motor. This may be accomplished by a motor drive circuit, such as the microcontroller 210, pre-driver 220, and output stage 230 of FIG. 4 or the control blocks 1040, 1050, 1060, 1061, 1062, 1070, 1080, 1090 as illustrated in FIG. 10.

The drive signal is controlled based on calibration data indicating a relationship between an actual angular position of a rotor of the motor in response to the drive signal and an expected angular position of a rotor of an ideal motor in response to the drive signal. The relationship may be indicated in terms of a difference between the expected angular position and the actual angular position or in terms of a mapping of the expected angular position to the actual angular position.

The calibration data may include multiple angular positions of the rotor. For each of multiple different actual angular positions of the rotor of the motor in response to the drive signal, the calibration data may indicate a relationship between the respective actual angular position and a corresponding expected angular position of the rotor of the ideal motor in response to the drive signal. For an n-fold rotational symmetry of the motor a number of the multiple different angular positions may be at least m, with m/n being a positive integer number. Here, it is noted that the n-fold symmetry of the motor may correspond to an n-fold symmetry of a stator of the motor and/or to an n-fold symmetry of the rotor of the motor, as explained referring to FIGS. 1 and 2. If the stator and the rotor of the motor have a different symmetry level, the n-fold symmetry of the motor may be defined by that one of the stator and the rotor which has the higher symmetry level.

The drive signal may be controlled based on a measured angular position of the rotor. The measured angular position of the rotor may be received at 1120. The measured angular position of the rotor may be received from a sensor element configured to unambiguously resolve the measured angular position over a full revolution of the rotor. For example, the measured angular position may be received from the above-mentioned angle sensor 250 or the above-mentioned angle sensor 1011.

At 1130, a corrected angular position may be calculated based on the relationship indicated by the calibration data. The corrected angular position may be calculated by adding a compensation angle indicated by the calibration data to the measured angular position, e.g., using the above-mentioned relation (4). The compensation angle may correspond to a difference between the expected angular position and the actual angular position.

At 1140, the drive signal may be controlled based on the corrected angular position. This may involve performing a vector rotation based on the corrected angular position.

If the calibration data includes multiple angular positions of the rotor, the drive signal may be controlled based on the relationship indicated for that one of the multiple different actual angular positions which best matches a measured angular position of the rotor of the motor.

For a measured angular position of the rotor of the motor which deviates from the multiple different actual angular positions, the method may include determining an approximation function (e.g. interpolation) of at least some of the relationships indicated by the calibration data and controlling the motor drive circuit based on the value of the approximation function at the measured angular position.

Figure 11B:
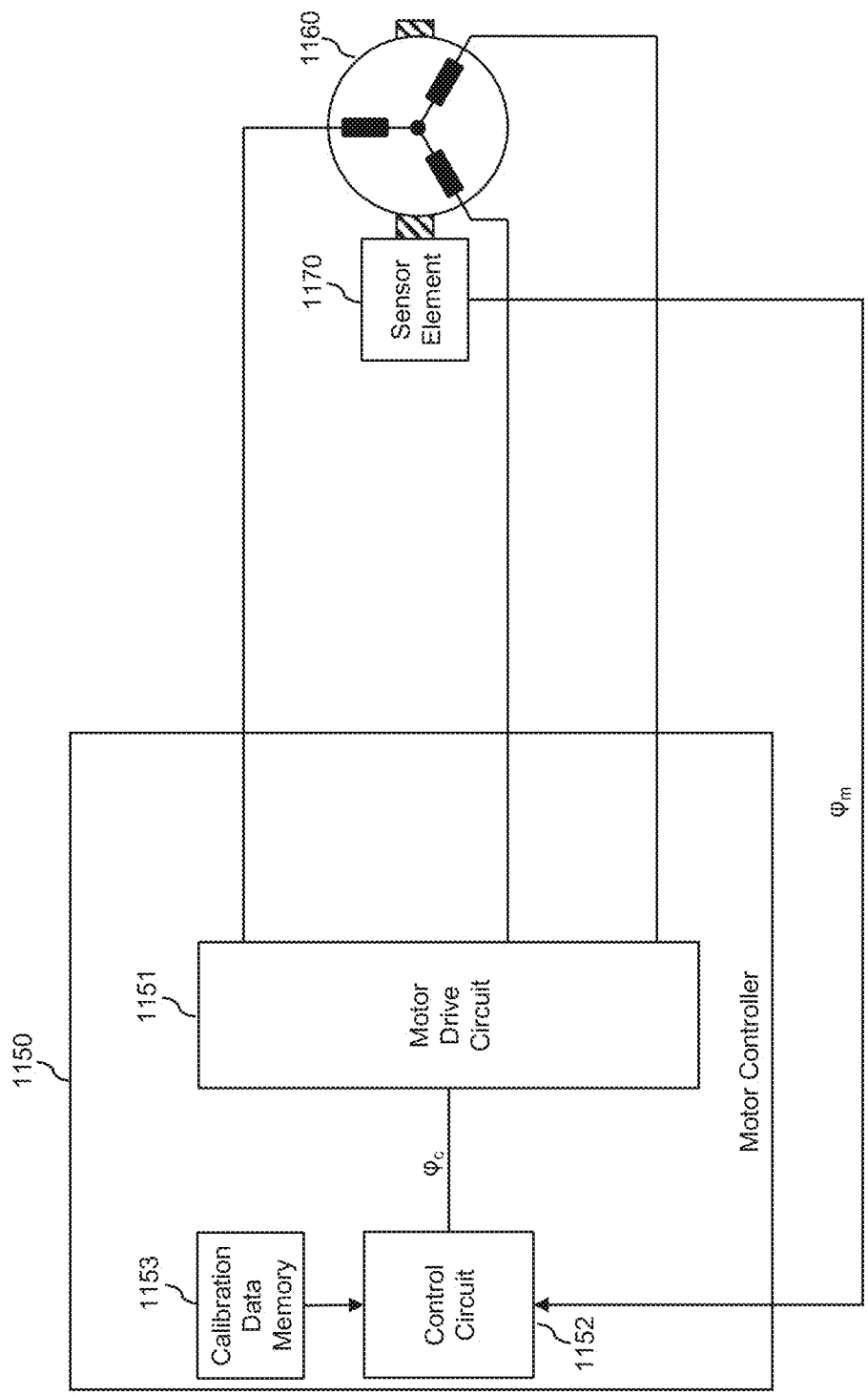
FIG. 11B shows a block diagram for schematically illustrating a motor controller operating according to the method of FIG. 11A.

FIG. 11B shows a block diagram for illustrating a motor controller 1150 configured to operate according to the method of FIG. 11A. The motor controller 1150 may be based on an architecture as illustrated in FIG. 4 or 10. As illustrated, the motor controller 1150 is used to control an EC motor 1160. The motor 1160 may for example correspond to the above-mentioned motor 100. A sensor element 1170 provides a measured angular position $\varphi_m$ of a rotor of the motor 1160. The sensor element 1170 may for example correspond to the above-mentioned angle sensor 250 or 1011.

The motor controller 1150 is provided with a motor drive circuit 1151, a control circuit 1152, and a calibration data memory 1153.

The motor drive circuit 1151 is configured to provide the drive signal to the motor 1160. The control circuit is configured to control the motor drive circuit 1151 based on calibration data. The calibration data memory 1153 may be used to store the calibration data. As mentioned above, the calibration data indicate a relationship between an actual angular position of a rotor of the motor in response to the drive signal and an expected angular position of a rotor of an ideal motor in response to the drive signal. As further illustrated, the motor controller 1150 has an input configured to receive the measured angular position $\varphi_m$. The control circuit 1152 may be configured to calculate the corrected angular position $\varphi_c$ from the measured angular position $\varphi_m$. As further illustrated, the control circuit 1152 may then control the motor drive circuit 1151 based on the corrected angular position $\varphi_c$.

Figure 12A:
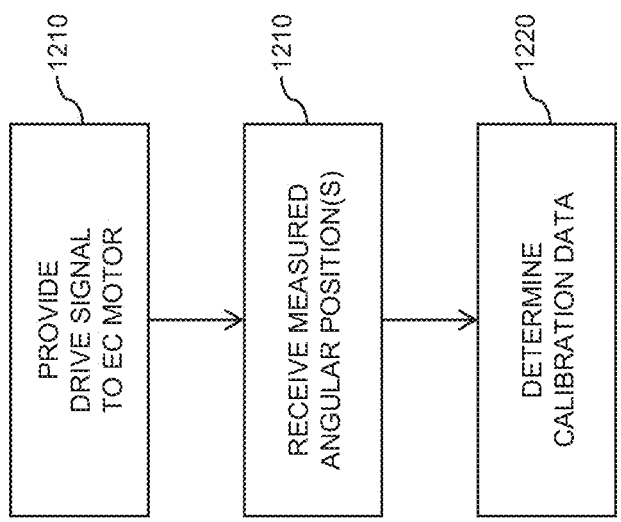
FIG. 12A shows a flowchart for schematically illustrating a method of calibrating a motor according to an embodiment.

FIG. 12A shows a flowchart for illustrating a method which may be used for calibrating an EC motor based on the concepts as described in the foregoing. Specifically, the method of FIG. 12 may be used to obtain the above-mentioned calibration data. The EC motor may for example correspond to the above-mentioned motor 100. The method of FIG. 12A may be performed by a motor controller, such as the above-mentioned motor controller 200. However, it is noted that in some scenarios the method of FIG. 12A could also be performed by a calibration device which is separate from the motor controller, e.g., by a component of a test system used in a final manufacturing stage, e.g., after assembling the motor with the motor controller.

At 1210, a drive signal provided to the motor is controlled. Specifically, the drive signal may be controlled to one or more states. Examples of such states are the above-mentioned basic vectors. The drive signal may be provided by a motor drive circuit, such as the microcontroller 210, pre-driver 220, and output stage 230 of FIG. 4 or the control blocks 1040, 1050, 1060, 1061, 1062, 1070, 1080, 1090 as illustrated in FIG. 10.

At 1220, at least one measured angular position of a rotor of the motor in response to the drive signal is received. In some scenarios, multiple measured angular positions of the rotor of the motor in response to different states of the drive signal may be received. The different states of the drive signal may for example correspond to basic vectors like explained in connection with FIG. 6. The measured angular position of the rotor may be received from a sensor element configured to unambiguously resolve the measured angular position over a full revolution of the rotor. For example, the measured angular position may be received from the above-mentioned angle sensor 250 or the above-mentioned angle sensor 1011.

At 1230, calibration data are determined based on the at least one measured angular position received at 1220. The calibration data indicate a relationship between an actual angular position of the rotor of the motor in response to the drive signal and an expected angular position of a rotor of an ideal motor in response to the drive signal. The relationship may be indicated in terms of a difference between the expected angular position and the actual angular position or in terms of a mapping of the expected angular position to the actual angular position.

If multiple measured angular positions of the rotor of the motor were received at 1220, the calibration data may be determined from the multiple measured angular positions. In this case, the calibration data may indicate, for each of multiple different actual angular positions of the rotor of the motor in response to the drive signal, a relationship between the respective actual angular position and a corresponding expected angular position of the rotor of the ideal motor in response to the drive signal. For an n-fold rotational symmetry of the motor the number of multiple different angular positions may be at least m, with m/n being a positive integer number.

In some scenarios at least one of the actual angular positions deviates from the measured angular positions. For this at least one actual angular position an approximation function may be determined based on at least some of the measured angular positions. The approximation function may for example be based on an interpolation or extrapolation of at least some of the measured angular positions. The relationship of the actual angular position to the corresponding expected angular position may then be determined based on the approximation function.

Figure 12B:
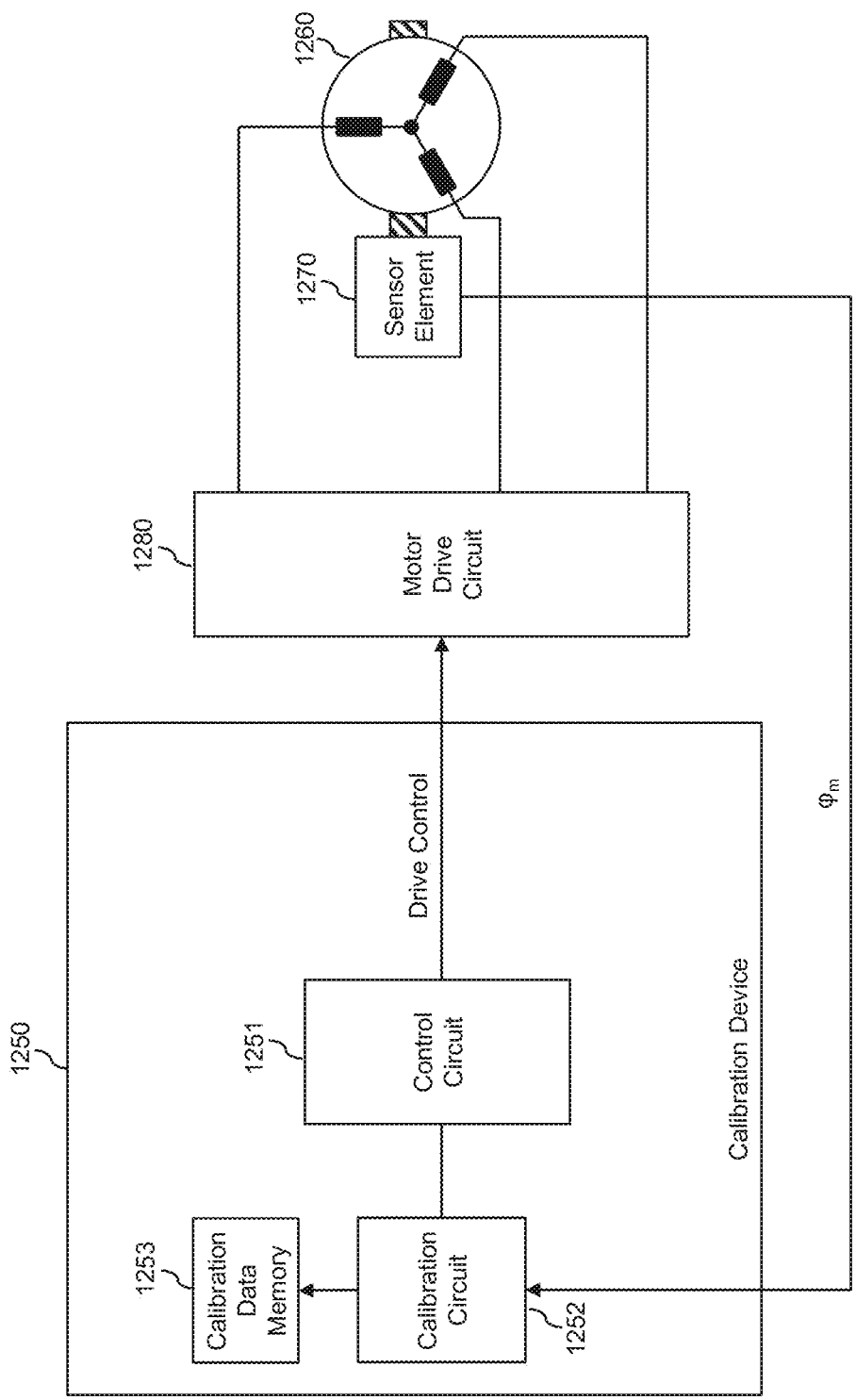
FIG. 12B shows a block diagram for schematically illustrating a calibration device operating according to the method of FIG. 12A.

FIG. 12B shows a block diagram for illustrating a motor calibration device 1250 configured to operate according to the method of FIG. 12A. The motor calibration device 1250 may be part of a motor controller, e.g., a motor controller as explained in connection with FIG. 4, 10, or 11A. However, it is also possible to implement the motor calibration device separately from a motor controller, by a component of a test system used in a final manufacturing stage, e.g., after assembling the motor with the motor controller.

As illustrated, the motor calibration device 1250 is used to calibrate an EC motor 1260. The motor 1260 may for example correspond to the above-mentioned motor 100 or 1160. A sensor element 1270 provides a measured angular position $\varphi_m$ of a rotor of the motor 1260. The sensor element 1270 may for example correspond to the above-mentioned angle sensor 250, 1011, or 1170. A motor drive circuit 1280 is used to provide a drive signal to the motor 1260. The motor drive circuit 1280 may for example be part of a motor controller, e.g., a motor controller as explained in connection with FIG. 4, 10, or 11A.

The motor calibration device 1250 is provided with a control circuit 1251, a calibration circuit 1252, and a calibration data memory 1253.

The control circuit 1251 is configured to control the drive signal provided to the motor 1260. Specifically, the control circuit may stimulate the motor drive circuit 1280 to generate one or more different states of the drive signal, e.g., basic vectors like explained in connection with FIG. 6.

The calibration circuit 1252 is configured to receive at least one measured angular position $\varphi_m$ of the rotor in response to the drive signal and to determine the calibration data based on the at least one measured angular position $\varphi_m$. As mentioned above, the calibration data indicate a relationship between an actual angular position of the rotor in response to the drive signal and an expected angular position of a rotor of an ideal motor in response to the drive signal. The calibration circuit 1252 may then store the calibration data in the calibration data memory 1253.

Some non-limiting embodiments are provided according to the following examples:

Example 1. A motor controller, comprising:
a motor drive circuit configured to provide a drive signal to an electronically commutated motor; and
a control circuit configured to control the motor drive circuit based on calibration data indicating a relationship between an actual angular position of a rotor of the motor in response to the drive signal and an expected angular position of a rotor of an ideal motor in response to the drive signal.

Example 2. The motor controller according to example 1, further comprising:
an input configured to receive a measured angular position of the rotor of the motor,
wherein the control circuit is configured to:
based on the relationship indicated by the calibration data, calculate a corrected angular position from the measured angular position, and
control the motor drive circuit based on the corrected angular position.

Example 3. The motor controller according to example 2, wherein the control circuit is configured to calculate the corrected angular position by adding a compensation angle indicated by the calibration data to the measured angular position, the compensation angle corresponding to a difference between the expected angular position and the actual angular position.

Example 4. The motor controller according to any one of examples 1-3, wherein for each of multiple different actual angular positions of the rotor of the motor in response to the drive signal the calibration data indicate a relationship between the respective actual angular position and a corresponding expected angular position of the rotor of the ideal motor in response to the drive signal.

Example 5. The motor controller according to example 4, wherein the control circuit is configured to control the motor drive circuit based on the relationship indicated for that one of the multiple different actual angular positions which best matches a measured angular position of the rotor of the motor.

Example 6. The motor controller according to example 4, wherein for a measured angular position of the rotor of the motor which deviates from the multiple different actual angular positions the control circuit is configured to:
  determine an approximation function of at least some of the relationships indicated by the calibration data, and
  control the motor drive circuit based on the value of the approximation function at the measured angular position.

Example 7. The motor controller according to any one of examples 4-6, wherein for an n-fold rotational symmetry of the motor a number of the multiple different actual angular positions is at least m, with m/n being a positive integer number.

Example 8. The motor controller according to any one of examples 1-7, further comprising:
  a calibration circuit configured to:
  receive at least one measured angular position of the rotor of the motor in response to the drive signal, and
  determine the calibration data based on the at least one measured angular position.

Example 9. The motor controller according to any one of examples 1-8, further comprising:
  a sensor element configured to unambiguously resolve the measured angular position over a full revolution of the rotor.

Example 10. A motor calibration device, comprising:
  a control circuit configured to control a drive signal provided to an electronically commutated motor; and
  a calibration circuit configured to:
  receive at least one measured angular position of a rotor of the motor in response to the drive signal, and
  based on the at least one measured angular position, determine calibration data indicating a relationship between an actual angular position of the rotor in response to the drive signal and an expected angular position of a rotor of an ideal motor in response to the drive signal.

Example 11. The motor calibration device according to example 10, wherein the calibration circuit is configured to:
  receive multiple measured angular positions of the rotor of the motor in response to different states of the drive signal,
  determine the calibration data from the measured angular positions to indicate, for each of multiple different actual angular positions of the rotor of the motor in response to the drive signal, a relationship between the respective actual angular position and a corresponding expected angular position of the rotor of the ideal motor in response to the drive signal.

Example 12. The motor calibration device according to example 11, wherein at least one of the actual angular positions deviates from the measured angular positions and for this at least one actual angular position the calibration circuit is configured to:
  determine an approximation function based on at least some of the measured angular positions, and
  determine the relationship of the actual angular position to the corresponding expected angular position based on the approximation function.

Example 13. The motor calibration device according to example 11 or 12, wherein for an n-fold rotational symmetry of the motor a number of the multiple different actual angular positions is at least m, with m/n being a positive integer number.

Example 14. The motor calibration device according to any one of examples 10-13, further comprising:
  a sensor element configured to unambiguously resolve the measured angular position over a full revolution of the rotor.

Example 15. A method of controlling a motor, the method comprising:
  providing a drive signal to an electronically commutated motor; and
  controlling the drive signal based on calibration data indicating a relationship between an actual angular position of a rotor of the motor in response to the drive signal and an expected angular position of a rotor of an ideal motor in response to the drive signal.

Example 16. The method according to example 15, comprising:
  receiving a measured angular position of the rotor of the motor;
  based on the relationship indicated by the calibration data, calculating a corrected angular position from the measured angular position; and
  controlling the drive signal based on the corrected angular position.

Example 17. The method according to example 16, comprising:
  calculating the corrected angular position by adding a compensation angle indicated by the calibration data to the measured angular position, the compensation angle corresponding to a difference between the expected angular position and the actual angular position.

Example 18. The method according to example 16 or 17, wherein the measured angular position is unambiguously resolved over a full revolution of the rotor of the motor.

Example 19. The method according to any one of examples 15-18, wherein for each of multiple different actual angular positions of the rotor of the motor in response to the drive signal the calibration data indicate a relationship between the respective actual angular position and a corresponding expected angular position of the rotor of the ideal motor in response to the drive signal.

Example 20. The method according to example 19, comprising:
  controlling the drive signal based on the relationship indicated for that one of the multiple different actual angular positions which best matches a measured angular position of the rotor of the motor.

Example 21. The method according to example 19, comprising:
  for a measured angular position of the rotor of the motor which deviates from the multiple different actual angular positions, determining an approximation function of at least some of the relationships indicated by the calibration data and controlling the drive signal based on the value of the approximation function at the measured angular position.

Example 22. The method according to any one of examples 19-21, wherein for an n-fold rotational symmetry of the motor a number of multiple different angular positions is at least m, with m/n being a positive integer number.

Example 23. A method of calibrating a motor, the method comprising:

controlling a drive signal provided to an electronically commutated motor;

receiving at least one measured angular position of a rotor of the motor in response to the drive signal; and based on the at least one measured angular position, determining calibration data indicating a relationship between an actual angular position of the rotor of the motor in response to the drive signal and an expected angular position of a rotor of an ideal motor in response to the drive signal.

Example 24. The method according to example 23, comprising:

receiving multiple measured angular positions of the rotor of the motor in response to different states of the drive signal, determining the calibration data from the multiple measured angular positions to indicate, for each of multiple different actual angular positions of the rotor of the motor in response to the drive signal, a relationship between the respective actual angular position and a corresponding expected angular position of the rotor of the ideal motor in response to the drive signal.

Example 25. The method according to example 24, wherein at least one of the actual angular positions deviates from the measured angular positions and for this at least one actual angular position the method comprises:

determining an approximation function based on at least some of the measured angular positions, and determining the relationship of the actual angular position to the corresponding expected angular position based on the approximation function.

Example 26. The method according to example 24 or 25, wherein for an n-fold rotational symmetry of the motor a number of multiple different angular positions is at least m, with m/n being a positive integer number.

Example 27. The method according to any one of examples 23-26, wherein the at least one measured angular position is unambiguously resolved over a full revolution of the rotor of the motor.

It is to be understood that the above-described concepts and embodiments are susceptible to various modifications. For example, the concepts could be implemented in a motor controller which includes the angle sensor used for the measurements of the rotor angle, or in a motor controller which has an interface for connecting to an external angle sensor used for the measurements of the rotor angle. Further, the illustrated concepts could be applied with respect to various kinds of motors and utilizations of such motors, e.g., motors utilized in an oil pump, in a fuel pump, in a wiper, in a heating or air conditioning system, in an electric turbo drive, in a hybrid turbo drive, in an electric damper system, or in an electric brake booster. Further, the illustrated concepts could be applied in non-automotive scenarios, e.g. robotics or home appliances. Still further, it is noted that the illustrated control circuits may be implemented on the basis of hardwired circuitry, on the basis of programmable processor circuitry, e.g., a microcontroller, on the basis of an application specific integrated circuit (ASIC) or combinations thereof.

The invention claimed is:

1. A motor controller, comprising:
 a control circuit configured to be coupled to a motor drive circuit, the control circuit configured to:
  receive a measured angular position of a rotor of an electronically commutated motor,
  calculate a corrected angular position from the measured angular position based on a relationship indicated by calibration data, and
  reduce torque ripple due to angle dependent deviations in a magnetic field of the rotor or of a stator of the motor over a full revolution of the motor compared using the calibration data, wherein reducing the torque ripple comprises controlling the motor drive circuit based on the corrected angular position based on the relationship indicated by the calibration data, wherein the calibration data comprises at least three values corresponding to at least three different actual angular positions of the rotor of the motor, each value of the at least three values of the calibration data indicates a relationship between a respective actual angular position of the at least three different actual angular positions and a corresponding expected angular position of the rotor of an ideal motor in response to a drive signal provided to the motor by the motor drive circuit, wherein the at least three different actual angular positions are distributed over the full revolution of the motor, and wherein controlling the motor drive circuit based on the corrected angular position based on the relationship indicated by the calibration data reduces the torque ripple compared to controlling the motor drive circuit without using the corrected angular position based on the relationship indicated by the calibration data.

2. The motor controller according to claim 1, further comprising:
 an input configured to receive the measured angular position of the rotor of the motor.

3. The motor controller according to claim 2, further comprising a sensor element configured to unambiguously resolve the measured angular position over the full revolution of the rotor.

4. The motor controller according to claim 1, wherein the control circuit is configured to calculate the corrected angular position by adding a respective compensation angle indicated by the calibration data to the measured angular position for each of the at least three different actual angular positions, the compensation angle corresponding to a difference between the expected angular position and the actual angular position.

5. The motor controller according to claim 1, wherein the control circuit is configured to control the motor drive circuit based on the relationship indicated for one actual angular position of the at least three different actual angular positions which best matches the measured angular position of the rotor of the motor.

6. The motor controller according to claim 1, wherein for a measured angular position of the rotor of the motor that deviates from an angular position of the at least three different actual angular positions, the control circuit is configured to:

determine an approximation function of at least some of the relationships indicated by the calibration data, and control the motor drive circuit based on a value of the approximation function at the measured angular position.

7. The motor controller of claim 6, wherein determining the approximation function comprises, performing a linear interpolation or performing a sinusoidal approximation.

8. The motor controller according to claim 1, wherein for an n-fold rotational symmetry of the stator of the motor, a number of the at least three different actual angular positions is at least m, with m/n being a positive integer number.

9. The motor controller according to claim 1, further comprising a calibration circuit configured to:
receive at least three measured angular positions of the rotor of the motor in response to the drive signal, and
determine the calibration data based on the at least three measured angular positions.

10. The motor controller according to claim 1, wherein the control circuit is further configured to apply a torque to the motor based on a torque input signal.

11. The motor controller of claim 10, further comprising a torque sensor mechanically coupled to the motor, wherein the torque sensor is configured to produce the torque input signal.

12. A motor calibration device, comprising:
a control circuit configured to be coupled to a motor drive circuit, the control circuit configured to control a drive signal provided to an electronically commutated motor by the motor drive circuit; and
a calibration circuit configured to:
receive at least three measured angular positions of a rotor of the motor in response to different states of the drive signal, and
determine calibration data from the measured angular positions to indicate, for each of at least three different actual angular positions of the rotor of the motor in response to the drive signal, a relationship between the respective actual angular position and a corresponding expected angular position of the rotor of an ideal motor in response to the drive signal, wherein
the calibration data comprises at least three values,
each value of the at least three values indicates the relationship between the respective actual angular position and the corresponding expected angular position of the rotor,
the at least three different actual angular positions are distributed over a full revolution of the motor,
the control circuit is configured to control the motor based on the calibration data, and
the control circuit controlling the motor based on the calibration data reduces torque ripple due to angle dependent deviations in a magnetic field of the rotor or of a stator of the motor over the full revolution of the motor compared to controlling the motor without using the calibration data.

13. The motor calibration device according to claim 12, wherein for a measured angular position that deviates from an angular position of the at least three different actual angular positions, the calibration circuit is configured to:
determine an approximation function based on the at least three measured angular positions; and
determine the relationship of the actual angular position to the corresponding expected angular position based on the approximation function.

14. The motor calibration device of claim 13, wherein determining the approximation function comprises, performing a linear interpolation or performing a sinusoidal approximation.

15. The motor calibration device according to claim 12, wherein for an n-fold rotational symmetry of the stator of the motor a number of the at least three different actual angular positions is at least m, with m/n being a positive integer number.

16. The motor calibration device according to claim 12, further comprising a sensor element configured to unambiguously resolve the measured angular positions over the full revolution of the rotor.

17. A method of controlling a motor, the method comprising:
receiving a measured angular position of a rotor of an electronically commutated motor,
calculating a corrected angular position from the measured angular position based on a relationship indicated by calibration data;
controlling a motor drive circuit configured to provide a drive signal to the electronically commutated motor; and
reducing torque ripple due to angle dependent deviations in a magnetic field of the rotor or of a stator of the motor over a full revolution of the motor compared using the calibration data, wherein reducing the torque ripple comprises controlling the motor drive circuit to provide the drive signal based on the corrected angular position based on the relationship indicated by the calibration data, the calibration data comprises at least three values corresponding to at least three different actual angular positions of the rotor of the motor, each value of the at least three values of the calibration data indicates a relationship between the respective actual angular position of the at least three different actual angular positions and a corresponding expected angular position of the rotor of an ideal motor in response to the drive signal, wherein the at least three different actual angular positions are distributed over the full revolution of the motor, and wherein controlling the motor drive circuit to provide the drive signal based on the corrected angular position based on the relationship indicated by the calibration data reduces the torque ripple compared to controlling the motor drive circuit to provide the drive signal without using the calibration data.

18. The method according to claim 17, wherein calculating the corrected angular position comprises adding a compensation angle indicated by the calibration data to the measured angular position, the compensation angle corresponding to a difference between the expected angular position and the actual angular position.

19. The method according to claim 17, wherein the measured angular position is unambiguously resolved over the full revolution of the rotor of the motor.

20. The method according to claim 17, comprising controlling the motor drive circuit to provide the drive signal based on the relationship indicated for that one of the at least three different actual angular positions which best matches a measured angular position of the rotor of the motor.

21. The method according to claim 17, further comprising:
for a measured angular position of the rotor of the motor which deviates from an actual angular position of the at least three different actual angular positions, determining an approximation function of at least some of the relationships indicated by the calibration data and controlling the motor drive circuit to provide the drive signal based on a value of the approximation function at the measured angular position.

22. The method according to claim 21, wherein determining the approximation function comprises, performing a linear interpolation or performing a sinusoidal approximation.

23. The method according to claim 17, wherein for an n-fold rotational symmetry of the stator of the motor a number of at least three different angular positions is at least m, with m/n being a positive integer number.

* * * * *